INVENTOR.
Thurman O. Ruettinger
BY
Harness and Harris
ATTORNEYS.

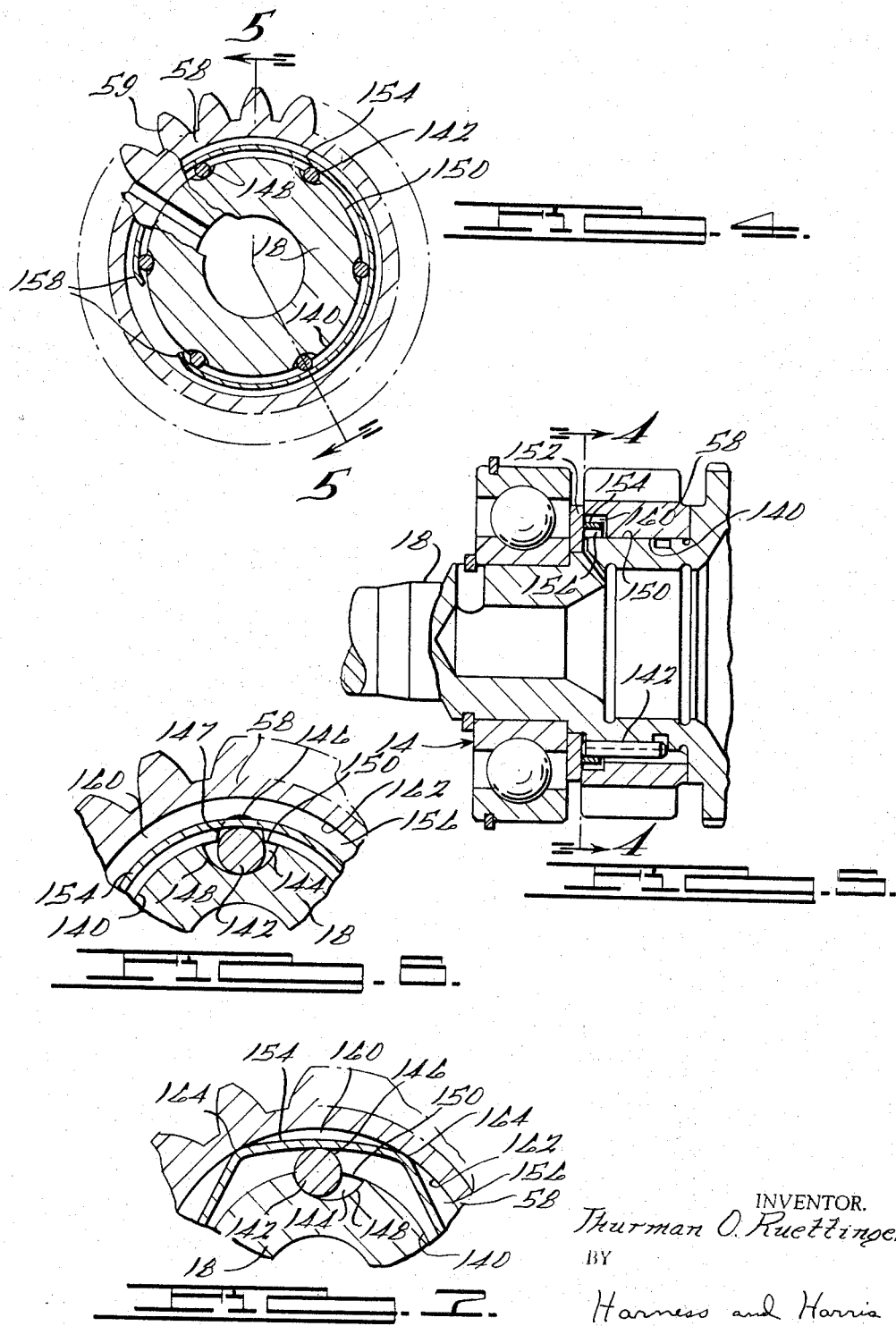

United States Patent Office 3,350,954
Patented Nov. 7, 1967

3,350,954
VIBRATION ISOLATION ARRANGEMENT
Thurman O. Ruettinger, Skaneateles, N.Y., assignor to Chrysler Corporation, Highland Park, Mich., a corporation of Delaware
Filed Nov. 22, 1965, Ser. No. 508,967
13 Claims. (Cl. 74—333)

This invention relates generally to a multiple speed power transmission mechanism and more particularly to the provision therein of a torsional vibration isolation arrangement of anti-rattle means for the elimination of oscillatory noises developed by at least some of the gears of the mechanism during certain periods of transmission operation.

While this invention is applicable in general to any mechanism employing a rotatable driving member and rotatable driven member, the invention will be discusesd hereinafter in relationship to a multiple speed, countershaft type transmission since this type of transmission is generally familiar to those skilled in the transmission art.

In a conventional countershaft type multiple speed transmission having, for example, synchronized gears mounted on the transmission output shaft and a cluster gear assembly mounted on or formed integrally with the countershaft, a first sliding gear is employed for selectively engaging certain of the individual gears of the cluster assembly to the transmission output shaft in order to effect the desired forward speed. In such arrangements, a second sliding gear is usually employed for completing the low forward speed and reverse speed drive from the transmission power input shaft to the power output shaft. Usually, this is accomplished by selectively causing the second sliding gear to engage either the transmission low forward speed gear or the reverse idler gear.

Generally, shifter forks are employed for engaging and axially shifting such sliding gears. In many cases such sliding gears are formed with an internally splined hub which slidably fits over external splines of, for example, the transmission output shaft. In order to assure ease in shifting such splined sliding gears, suitable tolerances must exist between the external and internal splines.

Although such tolerances are necessary, they allow, during certain periods of transmission operation, the splines and/or teeth of the gears to oscillate thereby producing a condition known as "gear rattle." The cause of such oscillation arises from the fact that the transmission cluster gear assembly is in constant engagement with at least certain of gears mounted on the output shaft and the input gear of the transmission which, in turn, is generally an integral part of the input shaft. Accordingly, torsional drive line vibrations are transmitted from the engine through the transmission input shaft and input gear to the cluster gear assembly. Such vibrations result in gear rattle as between the input gear and meshing cluster gear and between the cluster gears and meshing output shaft gears. Generally, when power is transmitted through the counter shaft the load on the various gears is sufficient to overcome the torsional vibrations and gear rattle is not a problem. However, when the gears are not transmitting power, as when the transmission is in neutral or the main power flow is through a direct clutching between the input and output shafts, they tend to rattle.

Accordingly, it is an object of this invention to provide means for damping or eliminating the rattle of such gears which are rotating on a shaft but not transmitting power to or from the shaft.

A further object is to provide an arrangement which will permit a transmission input shaft to rotate with non-uniform angular velocity while the mating input gear and all the constant mesh but unclutched gears being rotated thereby are permitted to rotate with substantially uniform angular velocity.

An additional object is to provide an anti-rattle arrangement which will eliminate or substantially reduce the transfer of torsional vibrations from the transmission input shaft to the input gear and cluster gear meshed therewith.

Other more specific objects and advantages of this invention will become apparent when reference is made to the following description and accompanying drawings wherein:

FIGURE 2 is obtained generally in a plane indicated by line 2—2 of FIGURE 1 with the axis of the reverse idler gear being parallel to the axis of the cluster gear but displaced a distance above the plane of the drawing of FIGURE 1;

FIGURE 4 is a cross-sectional assembly view of an input shaft, input gear and anti-rattle device constructed in accordance with the teachings of this invention taken generally on the plane of line 4—4 of FIGURE 1 and FIGURE 5;

FIGURE 5 is a cross-sectional view taken generally on the plane of line 5—5 of FIGURE 4;

FIGURE 6 is an enlarged fragmentary cross-sectional view similar to FIGURE 4 showing in greater detail the relationship of the components of the anti-rattle device; and FIGURE 7 is a view similar to FIGURE 6 showing the components of the anti-rattle device during a particular phase of its operation.

Figure 1:
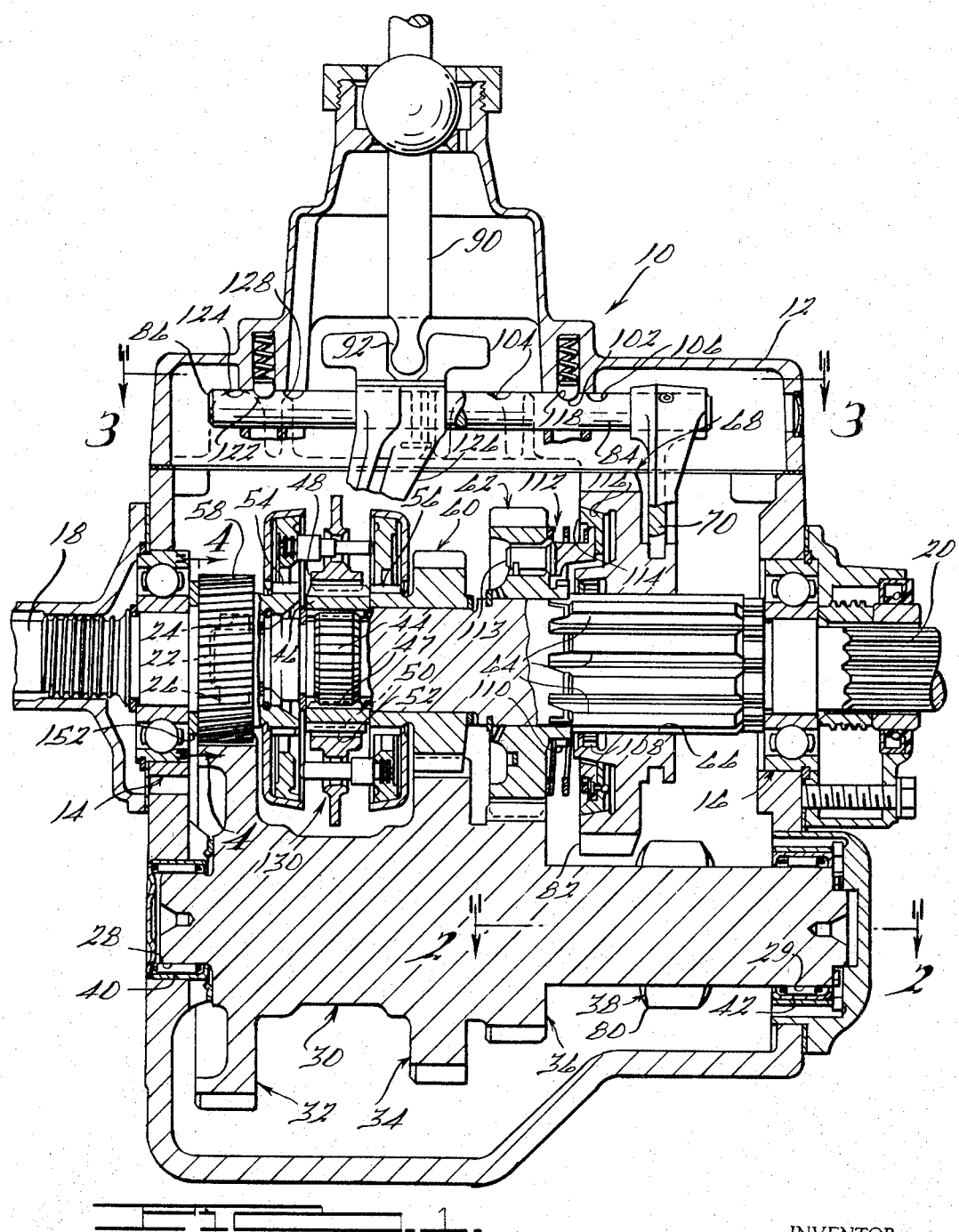
FIGURE 1 is a partial cross-sectional assembly view of a four-speed manual transmission mechanism constructed in accordance with this invention.

Referring now in greater detail to the drawings, the transmission 10 of FIGURE 1 is illustrated as being comprised of a case 12 having coaxially situated bearing assemblies 14 and 16 which respectively serve to journal one end of a transmission input shaft 18 and a mainshaft 20. The inner most end 22 of shaft 20 is piloted within a suitable bore 24 of input shaft 18 as by bearings 26.

A cluster gear assembly 30, having coaxial ends 28 and 29 suitably journaled in the case 12, comprises gears 32, 34, 36 and 38. Bearings as at 40 and 42 may, of course, be provided for journaling the cluster gear assembly.

A splined portion 44 formed on mainshaft 20 receives hub 46 as by means of closely conforming splines 47 formed internally of said hub. The hub 46 is, of course, suitably restrained against axial movement with respect to the shaft 20 once the hub is properly assembly thereto. Clutch sleeve 48 is provided with internally formed splines 50 which slidingly engage external splines 52 formed on the periphery of hub 56. Splines 50 are adapted to be capable of being selectively engaged with either the clutch teeth 54 or 56 of gears 58 and 60, respectively.

An input gear 58, which also functions as a top or fourth speed gear, is in constant mesh with gear 32 of the cluster gear assembly 30; gear 60, a third speed gear, is in constant mesh with gear 34, while a second speed gear 62 is in constant mesh with gear 36. Gears 60 and 62, are of course, freely rotatable on mainshaft 20.

A second splined portion 64, formed on shaft 20, slidingly engages splines 66 formed internally of a first speed gear 68. Splines 64 and 66 permit the axial shifting of gear 68 relative to the output shaft 20 as by a suitably engaging shifter fork 70.

Figure 2:
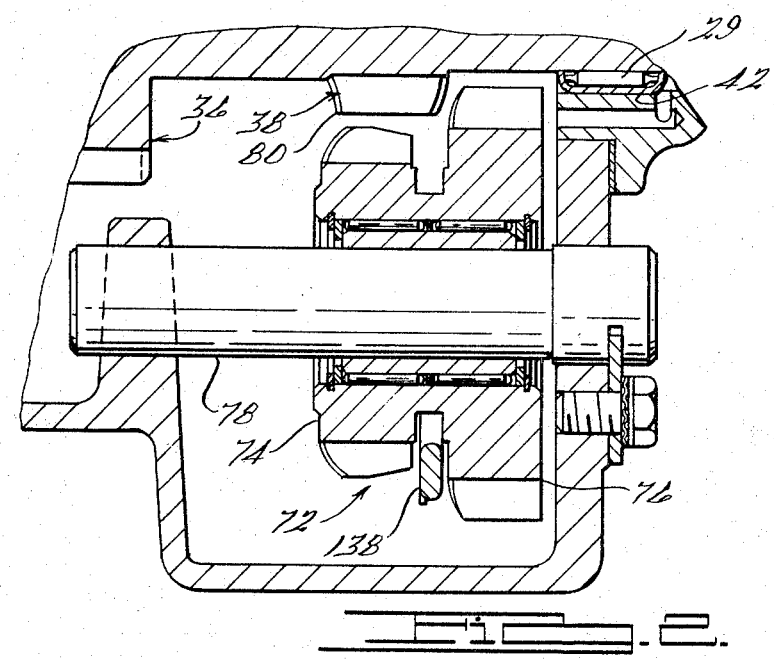
FIGURE 2 is a cross-sectional view of a portion of the cluster gear assembly of FIGURE 1 and of the transmission reverse idler gear.

A reverse idler gear 72, having distinct gear portions 74 and 76, is slidably and rotatably mounted on an idler shaft 78 as illustrated in FIGURE 2. At certain times, as by a reverse shifter fork 138, reverse idler gear 72 is moved to the left along shaft 78 until gear portion 76 is in mesh with teeth 80 of cluster gear 38. At this time gear portion 74 engages teeth 82 of low or first forward speed gear 68.

Figure 3:
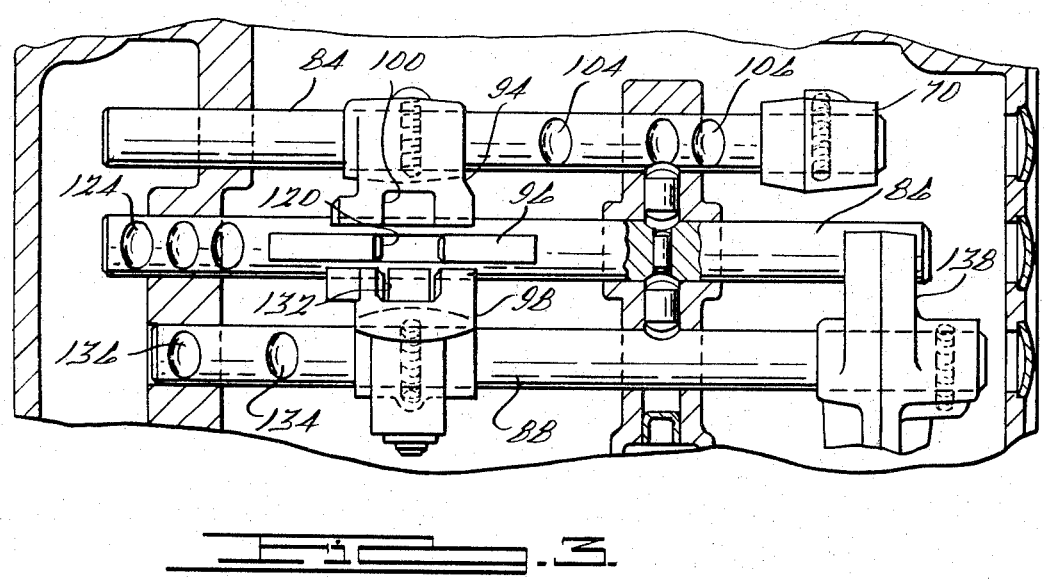
FIGURE 3 is a fragmentary view taken generally on the plane of line 3—3 of FIGURE 1 and looking in the direction of the arrows.

FIGURES 1 and 3 illustrate shift rails 84, 86 and 88 each of which carries at least one shifter fork. A manually actuated gear selector lever 90 is suitably pivotally supported in the case 12 and has its lower end 92 movable within confines defined by yoke-like members 94, 96 and 98 respectively (FIGURE 3) secured to said shift rails.

When the shift rails 84, 86 and 88 are in their respective positions shown in FIGURE 3, the transmission is then in neutral. That is, no power is being transmitted from any of the gears of the cluster gear assembly to the main or output shaft 20. Each of the shift rails is, of course, axially movable in order to selectively move the proper gears axially on the main shaft 20 or the idler shaft so as to cause the desired power transmission from the input shaft 18 to the output shaft 20. For example, if the selector lever 90 is first pivoted to cause its end 92 to move into opening 100 of the yoke member 94 and then, with its end 92 remaining in said opening, pivoted so as to cause shift rail 84 to move axially to the right (with regard to FIGURE 3) until the spring-loaded detent 102 (FIGURE 1) engages notch or recess 104, the shifter fork 70 will move low or first speed gear 68 along splines 64 of shaft 20 to a position wherein the teeth 82 of gear 68 are in meshed engagement with teeth 80 of cluster gear 38. At this time power will be transmitted from input shaft 18, input gear 58, cluster gear 32, cluster gear assembly 30, cluster gear 38, first speed gear 68 and its internal splines 66 and through splines 64 into the main or output shaft 20.

If the selector lever is now pivoted so as to move the shift rail 84 axially in the opposite direction to the left until the spring loaded detent 102 engages recess 106, shift fork 70 will move gear 68 to the left causing internally formed teeth 108 of gear 68 to be in engagement with externally formed teeth 110 of second speed gear 62. At this time power will be transmitted from the input shaft 18, through meshed gears 58 and 32, cluster gear assembly 30, meshed gears 36 and 62, teeth 110 of second speed gear 62 along with meshed teeth 108 of gear 68, and through the splines 66 and 64 into the output shaft 20.

Gear 62 is provided with a modified pin-type synchronizer 112 comprised of a plurality of angularly spaced axially directed pins, such as at 113, retained within gear 62; pins 113, among other things, serve to support a conical member 114 adapted to at least at times frictionally engage a mating conical surface 116 formed in the body of gear 68. The synchronizer 112 per se and its operation is well known in the art. Accordingly, it will suffice to say that the synchronizer functions to synchronize the rotational speeds of gears 62 and 68 in order to effect a smooth engagement between teeth 108 and 110 of gears 68 and 62, respectively, thereby avoiding the occurrence of interference and clashing between such teeth during the time that teeth 108 and 110 are being brought into driving engagement with each other.

Once shift rail 84 is returned to the position shown in FIGURES 1 and 3, being retained there by the detent 102 and recess 118, selector lever 90 may be pivoted so as to move end 92 out of opening 100 and into opening or slot 120 of yoke 96. Pivotal movement of the selector lever 90, while maintaining end 92 in slot 120, causes axial movement of the shift rail 86 to either the right or left of the position shown in FIGURE 3.

Assuming that the selector lever 90 is pivoted so as to cause shift rail 86 to move to the right until the spring-loaded detent 122 engages recess 124, the shift fork 126, (fragmentarily illustrated in FIGURE 1) being operatively connected in any well known manner to the clutch sleeve 48, causes the sleeve 48 to also move to the right so as to result in the splines 50 engaging both the splines 52 of the hub 46 and teeth or splines 56 of gear 60.

As a consequence of the above movement of the shift rail 86, power is transmitted, in the same way as previously described, to the cluster gear assembly 30, through meshed cluster gear 34 and third speed gear 60, splines 56, clutch sleeve 48 and splines 50, through the external splines 52 of the hub 46 and the internal splines 47 thereof, and into the output shaft 20 by the splines 44 formed thereon. If the selector lever 90 is actuated as to move shift rail 86 in the opposite direction, wherein detent 122 engages recess 128, clutch sleeve 48 will be moved in a corresponding direction resulting in said sleeve 48 and its internally formed splines 47 completing a direct connection between teeth or splines 54 and splines 44 of the output shaft as by means of the hub 46.

A pin type synchronizer 130 is provided in conjunction with third and fourth speed gears, 60 and 58, and the clutch sleeve 48. This synchronizer, as well as that illustrated at 112, is well known in the art. Its function is, of course, to synchronize the rotational speeds of gears 58, 60 and sleeve 48 during periods of changing speeds.

If reverse drive operation is desired, shift rails 84 and 86 are positioned as shown in FIGURE 3 and the selector lever 90 is pivoted within case 12 until the end 92 thereof is received within the opening 132 of shifter yoke 98. With end 92 remaining in opening 132, the selector lever is again pivoted causing the shift rail 88 to move to the left, as viewed in FIGURE 3, until recess 134 attains the position shown by recess 136. When the rail 88 is thusly moved the shifter fork 138, which is in engagement with reverse idler gear 72, has moved the gear 72 axially along the idler shaft 78 to a position wherein gear portion 76 is in meshed engagement with cluster gear 38 and gear portion 74 is in meshed engagement with teeth 82 of low or first speed gear 68. The effect of the above-described engagement of the reverse idler gear 72 is to reverse the direction of rotation of the low speed gear 68 and output shaft 20.

With the foregoing transmission components and their operation in mind, it will be noted that during certain periods, as for example fourth speed gear operation, the low or first speed gear 68 is rotating freely with the splines 64 of output shaft 20 and not transmitting any power. Accordingly, when the transmission is combined with an engine that is susceptible to the production of oscillatory frequencies, it has been found that when the engine is idling with the clutch engaged and the transmission in neutral or when the main power flow, as in fourth gear, is through a direct clutching between the input and output shafts and not through the cluster gear assembly an objectionable condition develops known as "gear rattle." It has been discovered that this objectionable condition is caused by torsional vibrations in the transmission input shaft and the input gear integrally formed therewith which result in their having non-uniform angular velocity. At the same time, however, all the constant mesh but unclutched gears of the transmission tend to rotate with a nearly uniform angular velocity due to their inherent mass inertias. Accordingly, since the angular velocity of the driving and driven members is not the same at any given moment, there is a constant rattle produced by the teeth of the driving members striking the teeth of the driven members.

It has now been discovered that the condition known as gear rattle can be eliminated or substantially reduced by having the transmission input shaft drive the transmission input gear through vibration or oscillation damping means constituting a driving connection therebetween.

The preferred embodiment of the present invention is illustrated in greater details in FIGURES 4 through 7.

FIGURE 5, a cross-sectional view taken substantially on the plane of line 5—5 of FIGURE 4, illustrates a transmission input shaft 18, input gear 58, and vibration insulation device in an assembled relationship. The transmission input shaft 18 is rotatably supported in a gear box front bearing 14 and has a journal surface 140 that rotatably supports the transmission input gear 58. The vibration insulator or anti-rattle arrangement comprises a plurality of coupling members or rollers 142 which allow, to a limited extent, input gear 58 and input shaft 18 to rotate relative to each other. The rollers 142 are disposed in a plurality of openings 144 which are located at the interface of the input shaft 18 and input gear 58 (FIGURE 6). The openings 144 are formed by a cooperating first and second axially extending plurality of grooves or recesses 146, 148 which are respectively formed in, and circumferentially spaced about, the bearing surface 150 of input gear 58 and journal surface 140 of input shaft 18. Each of the grooves 146, 148 has a generally arcuate cross-sectional contour conforming to a radius although, if desired, a portion 147 of the groove contour can deviate from the radius in order to provide the groove with greater depth. The first plurality of grooves 146 conform to a radius which is different than the radius of the second plurality of grooves 148. A thrust washer 152 (FIGURE 5) serves to limit axial movement of the rollers 142 with respect to the input gear 58.

As seen with particular reference to FIGURES 6 and 7, each of the first plurality of grooves 146 has a radius which closely corresponds to the radius of the rollers 142, while each of the second plurality of grooves 148 has a radius larger than that of rollers 142. In addition, the grooves 146, 148 have a depth such that the movement of each of the rollers in each of the grooves 146 is substantially restricted to radial travel with the longitudinal axis of the roller moving generally parallel to the axis of rotation of the input gear 58. With respect to the grooves 148 however, the rollers 142 rotate on the concave peripheral surface thereof so that their movement in grooves 148 is both radial and circumferential relative to the input shaft 18. In order to limit relative rotation between the input shaft 18 and the input gear 58, the rollers 142 have a diameter which is greater than the depth of the grooves in either of the first and second plurality of grooves 146, 148.

To further control the relative rotation of the input shaft 18 and input gear 58, a restraining means is provided which contacts the coupling members 142 and urges them toward the mid-line or bottom center of the grooves which are of the largest radius. Thus, in the illustrated embodiment, the restraining means urge the rollers 142 toward one extreme radial position or bottom center of the grooves 148 in input shaft 18. In a preferred embodiment, the restraining member comprises a spring 154 disposed between the input gear 58 and input shaft 18 and positioned (FIGURE 5) in an annular recessed portion 156 of the input gear 58. It should be understood that the recessed portion 156 can be positioned anywhere on the bearing surface 150 of input gear 58 as long as the spring 154 disposed within the recess portion can contact the rollers 142.

As seen with respect to FIGURES 6 and 7, movement of the roller will necessarily displace the spring 154. To accommodate this displacement, the spring may be secured about the rollers 142 as by integrally formed retaining end portions 158 (FIGURE 4) so as to provide a space 160 (FIGURE 6) between the spring 154 and the surface 162 of recessed portion 156 into which the spring may move upon being radially displaced.

In a second embodiment as shown in FIGURE 7, the spring may be shaped so that it contacts the surface 162 of recessed portion 156 at a plurality of positions 164 thereby providing a space 160 between the positions 164 into which the spring may move.

When the transmission is operated such that the main power flow passes from the input shaft 18, through mating input gear 58, cluster gear assembly 30 and into the output shaft 20, the large tangential load, as compared to the radially directed force of spring 154, results in the input shaft 18 rotating slightly with respect to the input gear 58 which causes the rollers 142 to be forced to the sides of the grooves 148 of input shaft 18. This movement as seen with reference to FIGURE 7 results in the rollers 142 moving radially outward to the limit of travel in the grooves 146 of input gear 58. Accordingly, torque is thereby transmitted from the input shaft 18 to the input gear 58 through compression in the rollers.

If the transmission is placed in neutral, or for example, fourth gear so that the main power flow from the input shaft 18 passes elsewhere other than through teeth 59 of the input gear 58, the force of spring 154 is sufficient to hold the rollers radially inward at or near the mid-lines of the grooves 148 in input shaft 18. Accordingly, the variations in angular velocity of the input shaft 18, resulting from oscillatory frequencies induced therein from the engine, cause the rollers 142 to oscillate on the surface of the grooves 148 about the mid-lines thereof. Therefore, the non-uniform angular velocity of the driving member or input shaft 18 is not transmitted to the driven member or input gear 58 and subsequent members of the power train in constant driving engagement therewith.

It will be noted that due to the contour of the grooves 148 of input shaft 18 and the resistance presented by spring 154, an effective variable spring rate is established between input shaft 18 and gear 58 which acts to provide a smooth transmission of torque when the transmission is shifted from a condition where the torque is transmitted from the input shaft to the output shaft via the cluster gear assembly to a condition where there is a direct connection between the input and output shafts (fourth speed gear). Thus, it will be noted that the greater the displacement of the rollers from the mid-lines or bottom center of the input shaft grooves 148, the greater is the torque carrying ability between the input shaft 18 and input gear 58. At this point, an important feature of the present invention should be noted. This feature resides in the fact that due to the semi-circular shape of the grooves in the driving member, vibrations are damped in both directions. For example, because of the torsional vibrations of the engine, the input shaft has non-uniform angular velocity and, accordingly, pulsates between clockwise and counter-clockwise movement with respect to the input gear. However, regardless of the direction of rotation of the input shaft with respect to the input gear, its movement in either direction is damped by the variable spring rate described above. A substantially "solid drive" is achieved when the radially outward movement of the rollers 142 is terminated by the surface of the input gear grooves 146.

Although the invention has been described with respect to the input shaft and input gear of a transmission, it should be apparent that the anti-rattle device of this invention can be practiced in other arrangements where there are driving and driven members in direct engagement with each other. It will, of course, be apparent that a reversal of parts is contemplated by this invention. Thus, for example, the grooves 148 having the larger radius could be formed in the input gear 58 and the grooves of smaller radius 146 formed in the input shaft 18. Of course, in this arrangement the spring 154 and recessed portion 156 would be located in the shaft.

Although only one preferred embodiment of the invention has been disclosed and described, it is apparent that other embodiments and modifications of the invention may be made within the scope of the appended claims.

I claim:

1. An anti-rattle arrangement for damping oscillating vibrations between a first rotatable driving member and a second rotatable driven member wherein said members are rotatable one within the other with one of said members being journalled about the other, said anti-rattle arrangement comprising a first plurality of grooves formed in and circumferentially spaced about one of said members with each of said first plurality of grooves having at least a portion of arcuate cross-section conforming to a first radius, a second plurality of grooves formed in and circumferentially spaced about the other of said members with each of said second plurality of grooves having at least a portion of arcuate cross-section conforming to a second radius different from said first radius, said first and second plurality of grooves being spaced so as to be in radial juxtaposition with respect to each other, a plurality of coupling members, each of said first and second plurality of grooves being adapted to cooperatively receive one of said coupling members therebetween, said coupling members being of a dimension so as to limit relative rotation between said driving and driven members, and restraining means in contact with said coupling members for urging said coupling members toward engagement with the plurality of grooves in one of said rotatable members.

2. An anti-rattle arrangement according to claim 1 wherein one of said first and second members is journalled on said other member so that said one member has a bearing surface in contact with a journal surface of the other with said first plurality of grooves being formed in and circumferentially spaced about said bearing surface and said second plurality of grooves being formed in and circumferentially spaced about said journal surface so that said second plurality of grooves cooperate with said first plurality of grooves to form a plurality of apertures at the interface of said bearing surface and journal surface, and wherein said first and second plurality of grooves extend parallel to the axis of rotation of the driving member.

3. An anti-rattle arrangement according to claim 1 wherein said coupling members are cylindrical rollers.

4. An anti-rattle arrangement according to claim 1 wherein the said arcuate portions of the grooves formed in said driving member are of a radius which is greater than the radius of the said arcuate portions of the grooves formed in the driven member.

5. An anti-rattle arrangement according to claim 1 wherein the restraining means is carried by one of said members and comprises a spring member disposed between said driving and driven members.

6. An anti-rattle arrangement according to claim 1 wherein said coupling members are cylindrical rollers each having a diameter greater than the depth of said grooves in either of said first or second plurality of grooves, wherein each groove of said first plurality of grooves has a radius substantially conforming with the radius of the rollers so that the movement of said rollers in said grooves is generally restricted to radial travel generally parallel to the axis of rotation of said driving and driven members, and wherein each groove of said second plurality of grooves has a radius larger than the radius of the rollers so that the movement of said rollers in said second plurality of grooves is both radial and circumferential relative to said driving and driven members.

7. An anti-rattle arrangement for damping oscillatory vibrations in a power transmission mechanism having an input shaft provided with a journal surface, an output shaft, a countershaft gear cluster, a plurality of gear trains between said input and output shafts, and an input gear having a bearing surface in contact with said journal surface and being in driving engagement with said countershaft gear cluster, said anti-rattle arrangement comprising a first plurality of circumferentially-spaced axially extending grooves in the bearing surface of said input gear with each of said grooves having at least a portion of arcuate cross-section conforming to a first radius, a second plurality of circumferentially spaced axially extending grooves in the journal surface of said input shaft with each of said second plurality of grooves having at least a portion of arcuate cross section conforming to a second radius different from said first radius, said first and second plurality of grooves being spaced so that they cooperate to form a plurality of apertures at the interface of said bearing and journal surfaces, a plurality of rollers respectively disposed in each of said plurality of apertures, each of said rollers having a diameter greater than the depth of said grooves in either of said first or second plurality of grooves so as to thereby limit relative rotation between said input shaft and input gear, and restraining means in contact with said rollers for urging said rollers toward engagement with the plurality of grooves having the larger radius.

8. An anti-rattle arrangement according to claim 7 wherein each of said first plurality of grooves in said input gear has a radius substantially conforming with the radius of said rollers so that the movement of said rollers in said first plurality of grooves is substantially restricted to radial travel generally parallel to the axis of rotation of said input gear and wherein each of said second plurality of grooves in said input shaft has a radius larger than the radius of said rollers so that the movement of said rollers in the grooves of said input shaft is both radial and circumferential relative to said input shaft.

9. An anti-rattle arrangement according to claim 7 wherein the restraining means comprises a single continuous spring member disposed between said input shaft and input gear.

10. An anti-rattle arrangement according to claim 7 wherein the surface having the grooves of smaller radius formed therein is provided with a recess portion and wherein the restraining means comprises a spring member, said spring member being positioned in said recess portion.

11. An anti-rattle arrangement according to claim 7 wherein said first radius is smaller than said second radius, wherein said arrangement includes a continuous annular recess formed in the bearing surface of said gear, and wherein said restraining means comprises a generally annular spring received within said recess which engages each of said rollers so as to resiliently urge said rollers radially inwardly toward the axis of rotation of said input shaft.

12. An anti-rattle arrangement according to claim 11 wherein said spring comprises a plurality of chordal segments integrally joined at points engaging the radially outermost surface of said annular recess.

13. An anti-rattle arrangement according to claim 12 wherein said plurality of chordal segments is equal in number to the plurality of said rollers.

References Cited

UNITED STATES PATENTS

| | | | |
|---|---|---|---|
| 2,017,591 | 10/1935 | Dumm | 64—27 |
| 2,196,716 | 4/1940 | Williams | 64—27 |
| 2,500,723 | 3/1950 | Ware | 74—411 |
| 3,109,317 | 11/1963 | Cousino et al. | 74—411 |
| 3,292,446 | 12/1966 | Schofield et al. | 74—333 |

DONLEY J. STOCKING, *Primary Examiner.*

H. S. LAYTON, *Assistant Examiner.*